United States Patent
Chandran et al.

(10) Patent No.: US 6,923,004 B2
(45) Date of Patent: Aug. 2, 2005

(54) SYSTEM INTEGRATION OF A STEAM REFORMER AND GAS TURBINE

(75) Inventors: Ravi Chandran, Ellicott City, MD (US); Momtaz N. Mansour, Highland, MD (US)

(73) Assignee: Manufacturing And Technology Conversion International, Inc., Baltimore, MD (US)

( * ) Notice: Subject to any disclaimer, the term of this patent is extended or adjusted under 35 U.S.C. 154(b) by 0 days.

(21) Appl. No.: 10/727,784

(22) Filed: Dec. 4, 2003

(65) Prior Publication Data

US 2004/0079087 A1 Apr. 29, 2004

Related U.S. Application Data

(63) Continuation of application No. 09/642,137, filed on Aug. 18, 2000, now abandoned.
(60) Provisional application No. 60/149,870, filed on Aug. 19, 1999.

(51) Int. Cl.[7] .............................................. F02C 3/28
(52) U.S. Cl. ....................... 60/781; 60/39.12; 60/39.182
(58) Field of Search ............................... 60/780, 39.12, 60/39.182, 781

(56) References Cited

U.S. PATENT DOCUMENTS

| | | | |
|---|---|---|---|
| 2,937,500 A | 5/1960 | Bodine, Jr. | |
| 4,588,659 A | 5/1986 | Abens et al. | |
| 4,754,607 A | 7/1988 | Mackay | |
| 4,918,915 A | * 4/1990 | Pfefferle | 60/781 |
| 4,976,940 A | 12/1990 | Paulson | |
| 5,059,404 A | 10/1991 | Mansour et al. | |
| 5,094,926 A | 3/1992 | Kobayashi et al. | |
| 5,133,180 A | 7/1992 | Horner et al. | |
| 5,133,297 A | 7/1992 | Mansour | |

(Continued)

FOREIGN PATENT DOCUMENTS

| | | |
|---|---|---|
| DE | 3913322 A1 | 10/1990 |
| EP | 0383565 A1 | 8/1990 |
| EP | 0814146 A2 | 12/1997 |
| EP | 1136542 | 9/2001 |
| WO | WO 0027951 | 5/2000 |

OTHER PUBLICATIONS

U.S. Statutory Invention Registration to Fourie, et al., Registration No. H1, 849, May 2, 2000.

*Primary Examiner*—Ehud Gartenberg
(74) *Attorney, Agent, or Firm*—Dority & Manning, P.A.

(57) ABSTRACT

A novel process and apparatus for power generation from biomass and other carbonaceous feedstocks are provided. The process integrates a pulse combustor steam reformer with a gas turbine to generate electricity such that (i) efficiency is higher than those of conventional and current advanced power systems, (ii) emissions are lower than those proposed in the new environmental regulations, and (iii) performance is comparable to that of combined cycle, even though a bottoming cycle is not included here. The pulse combustor steam reformer generates a hydrogen-rich, medium-Btu fuel gas that is fired in a gas turbine to generate electricity. The apparatus may be configured to produce only power or combined heat and power.

13 Claims, 6 Drawing Sheets

SCHEMATIC OF THE INTEGRATED GASIFICATION GAS TURBINE SYSTEM FOR BIOMASS POWER GENERATION

U.S. PATENT DOCUMENTS

| | | |
|---|---|---|
| 5,197,399 A | 3/1993 | Mansour |
| 5,205,728 A | 4/1993 | Mansour |
| 5,208,113 A | 5/1993 | Kinoshita |
| 5,211,704 A | 5/1993 | Mansour |
| 5,255,634 A | 10/1993 | Mansour |
| 5,285,629 A | 2/1994 | Gounder |
| 5,306,481 A | 4/1994 | Mansour et al. |
| 5,353,721 A | 10/1994 | Mansour et al. |
| 5,366,371 A | 11/1994 | Mansour et al. |
| 5,376,569 A | 12/1994 | Gur et al. |
| 5,388,395 A | 2/1995 | Scharpf |
| 5,394,686 A | 3/1995 | Child et al. |
| 5,536,488 A | 7/1996 | Mansour et al. |
| 5,554,453 A | 9/1996 | Steinfield et al. |
| 5,637,192 A | 6/1997 | Mansour et al. |
| 5,638,609 A | 6/1997 | Chandran et al. |
| 5,645,951 A | 7/1997 | Johnssen |
| 5,666,823 A | 9/1997 | Smith et al. |
| 5,704,206 A * | 1/1998 | Kaneko et al. ............ 60/39.12 |
| 5,707,762 A | 1/1998 | Johnssen |
| 5,740,673 A | 4/1998 | Smith et al. |
| 5,795,666 A | 8/1998 | Johnssen |
| 5,819,522 A | 10/1998 | Topsoe |
| 5,842,289 A | 12/1998 | Chandran et al. |
| 5,865,023 A | 2/1999 | Sorensen et al. |
| 5,900,329 A | 5/1999 | Reiter et al. |
| 5,937,631 A | 8/1999 | Holm-Larsen et al. |
| 5,955,039 A | 9/1999 | Dowdy |
| 6,032,456 A | 3/2000 | Easom et al. |
| 6,074,769 A | 6/2000 | Johnssen |
| 6,077,620 A | 6/2000 | Pettit |
| 6,393,821 B1 * | 5/2002 | Prabhu ........................ 60/781 |

\* cited by examiner

SCHEMATIC OF THE INTEGRATED GASIFICATION GAS TURBINE SYSTEM FOR BIOMASS POWER GENERATION

A SIMPLIFIED BLOCK-FLOW DIAGRAM OF
THE THERMOMECHANOCHEMICAL SYSTEM

SCHEMATIC OF THE INTEGRATED STEAM REFORMER/MICROTURBINE SYSTEM FOR POWER GENERATION FROM ANIMAL BIOMASS

SYSTEM INTEGRATION OF A STEAM REFORMER AND GAS TURBINE

RELATED APPLICATIONS

Continuation of prior application Ser. No. 09/642,137 filed Aug. 18, 2000, now abandoned.

The present application is based upon a provisional application filed on Aug. 19, 1999 having Ser. No. 60/149,870.

FIELD OF THE INVENTION

The present invention relates to a thermomechanochemical process and apparatus for efficient, clean, modular, cost-effective, green and climate-change neutral power or combined heat and power generation from biomass. Other carbonaceous feedstocks can be used as well.

BACKGROUND OF THE INVENTION

Many different options are available for power generation. The fuel can be combusted, gasified, pyrolyzed, bioprocessed or liquefied and utilized in engines, steam power plants (boiler, steam turbine, etc.), gas turbines, gas and steam power plants, and fuel cells. Among these, the most efficient and environmentally superior route for electric power generation is, of course, fuel cells. For the small-scale power (10 $KW_e$ to 5 $MW_e$) sector, combined-cycle units are generally not applicable due to low efficiency and high cost. Such traditional steam power plants are generally less than 20% efficient. Engines are more efficient (20 to 40%), but are typically fired with diesel or natural gas. A more viable alternative to fuel cell technology in the near-term is a biopower system based on a gas turbine.

However, many conventional power plants based on biomass combustion have experienced operational difficulties, especially when firing non-wood biomass fuels. These problems resulted from the deposition of mineral matter on heat exchange surfaces (boiler tubes, superheaters and water walls) or from the agglomeration of ash in the fluidized bed. Gasification of biomass, in contrast, renders it possible to avoid these problems, minimize emissions and integrate with the fuel cell.

Currently, there exists many types of gasifiers, such as high pressure, low pressure, partial oxidation, autothermal, indirectly heated, oxygen/air/steam-blown, fixed/fluidized bed or entrained flow gasifiers. Each system has its advantages. For example, in direct gasification, partial oxidation or autothermal reactions are employed that yield an undesirable low-Btu fuel gas that requires oxygen input. The production of a low-Btu fuel gas is due to the fact that both exothermic and endothermic reactions take place in situ in the case of direct gasification, and the products of exothermic reactions dilute the product gases to be combusted for gas turbine power generation.

In view of the above, currently, a need exists for a new gasification process that is better suited for power generation applications.

SUMMARY OF THE INVENTION

In accordance with the present invention, a process for producing electricity from carbonaceous materials is disclosed. The carbonaceous materials can be, for instance, coal, pulp and paper waste, wood products such as wood chips or sawdust, municipal waste, industrial waste, sewage, food waste, plant matter, rice straw, and animal waste.

The process includes providing a fluidized bed containing a particulate material and a fluidizing medium. The fluidizing medium is steam. The particulate material can have a particle size less than about 500 microns and can include sand, alumina, magnesium oxide, and the like.

Any suitable combustion device can be used to indirectly heat the fluidized bed. In one embodiment, a pulse combustion device combusts a fuel source to form a pulse combustion stream. The pulse combustion stream indirectly heats the fluidized bed. As used herein, indirectly heating the bed means that the pulse combustion stream does not contact the contents of the bed.

A carbonaceous material is fed to the fluidized bed. The fluidized bed is maintained at a temperature sufficient for the carbonaceous materials to endothermically react with the steam to form a product gas stream. The product gas stream can contain, for instance, lower molecular weight hydrocarbons. The product gas stream is then fed to a gas turbine. The gas turbine combusts the product gas stream in order to rotate a turbine and generate electricity. In one embodiment, the product gas stream can be compressed by a gas compressor and mixed with air prior to being combusted in the gas turbine.

The temperature in the fluidized bed can be from about 900 degrees F. to about 1800 degrees F., and particularly from about 1100 degrees F. to about 1600 degrees F. The carbonaceous materials can remain in the bed for a time from about ½ hour to about 15 hours, and particularly from about 2 hours to about 10 hours. For most applications, the weight ratio between steam and the carbonaceous materials can be from about 0.75:1 to about 3:1.

In order to conserve energy, in one embodiment, a portion of the product gas stream is fed to a heat exchanger that heats steam which is fed to the fluidized bed. Steam can also be generated or heated using the flue gas from the pulse combustion device.

The flue gas of the pulse combustion device can also be used to heat air being fed to the gas turbine and can be used to heat or generate steam fed to a dryer for drying the carbonaceous materials prior to being fed to the fluidized bed.

In order to clean the product gas stream prior to being combusted in the gas turbine, the product gas stream can be fed through a cyclone for removing particulate material and can be fed to a scrubber for removing hydrogen sulphide or other undesirable constituents.

In one embodiment of the present invention, the process is particularly well suited to processing rice straw. When processing rice straw, silica separates from the straw in the fluidized bed which can be collected and recovered. The silica can then be used to form semiconductor wafers and other useful articles.

In an alternative embodiment, the process of the present invention is well suited to treating animal waste. In this embodiment, the fluidized bed should be at a temperature of at least 1400 degrees F. When processing animal waste, fertilizer components, such as nitrogen, phosphorous and potassium can be recovered during the process. Specifically, phosphorous and potassium can be recovered from a particulate removal device that is placed in communication with the product gas stream exiting the fluidized bed. Nitrogen, on the other hand, can be recovered as ammonia from the product gas stream.

BRIEF DESCRIPTION OF THE DRAWINGS

A full and enabling disclosure of the present invention, including the best mode thereof, to one skilled in the art, is set forth more particularly in the remainder of the specification including reference to the accompanying figures in which.

Figure 1:
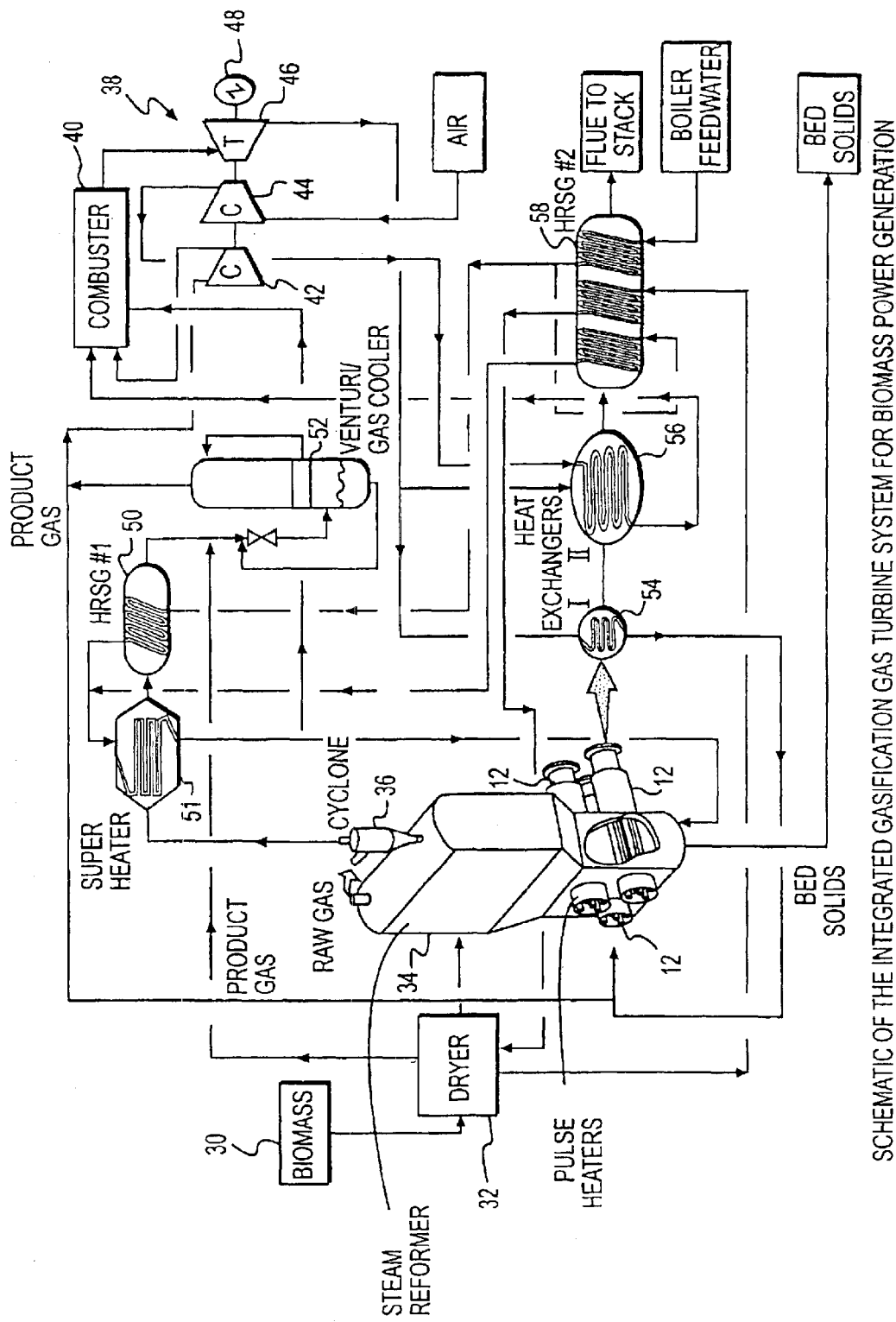
FIG. 1 is a schematic diagram of one embodiment of a process made in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

The present invention is directed to a gasification process that integrates a steam reformer with a gas turbine. In particular, the present invention is directed to a novel process and apparatus that integrates a pulse combustor with a steam reformer and gas turbine to generate electricity, i.e. a thermomechanochemical system (TMCS).

Although the use of pulse combustors is relatively well-known in the art, as indicated for example by U.S. Pat. Nos. 5,059,404, 5,133,297, 5,255,634, 5,211,704, 5,205,728, 5,366,371, 5,197,399, 5,353,721, 5,638,609, and 5,637,192 which are herein incorporated by reference, it is believed that the novel pulse combustor steam-reforming process of the present invention is better suited for power generation applications.

The product gases of a process of the present invention are typically hydrogen-rich, medium-Btu gases (does not need oxygen input) generated through endothermic reactions in a reducing environment. The heat of reaction is supplied indirectly by the resonance tubes of one or more modular pulsating burners. This maximizes the calorific value of the reformate gas used in the gas turbine and, hence, maximizes the electrical conversion efficiency of the power plant.

A system of the present invention also overcomes the limitations of prior oxygen-blown partial oxidation and two-stage circulating solids gasification systems. In contrast to these systems, a system of the present invention provides that biomass (waste or cultivated) feedstock be fed to a single fluidized bed vessel and reacted with steam to generate a hydrogen-rich product gas.

The use of a single fluidized bed offers an ideal environment for effecting the endothermic steam-reforming reaction with the heat supplied indirectly through heat transfer surfaces that are formed from the resonant section of a pulse combustor immersed within the fluid bed. These pulsations translate into improved heat transfer rates (as much as 3 to 5 times) through the fire tubes and into the fluid bed.

Using a system of the present invention, a synthesis quality product gas can be generated from a wide spectrum of feedstocks including biomass, coals, municipal waste, refuse-derived fuel (RDF), industrial sludges, and spent liquor from the pulp and paper industry, without the use of air or oxygen.

Moreover, the product gas is free of both diluent nitrogen and combustion-generated $CO_2$. The complete reforming process is accomplished using only a single vessel, and no circulation of hot solids is needed. The combustion process utilizing clean product gas eliminates the need for flue gas treatment from the combustors.

Figure 2:
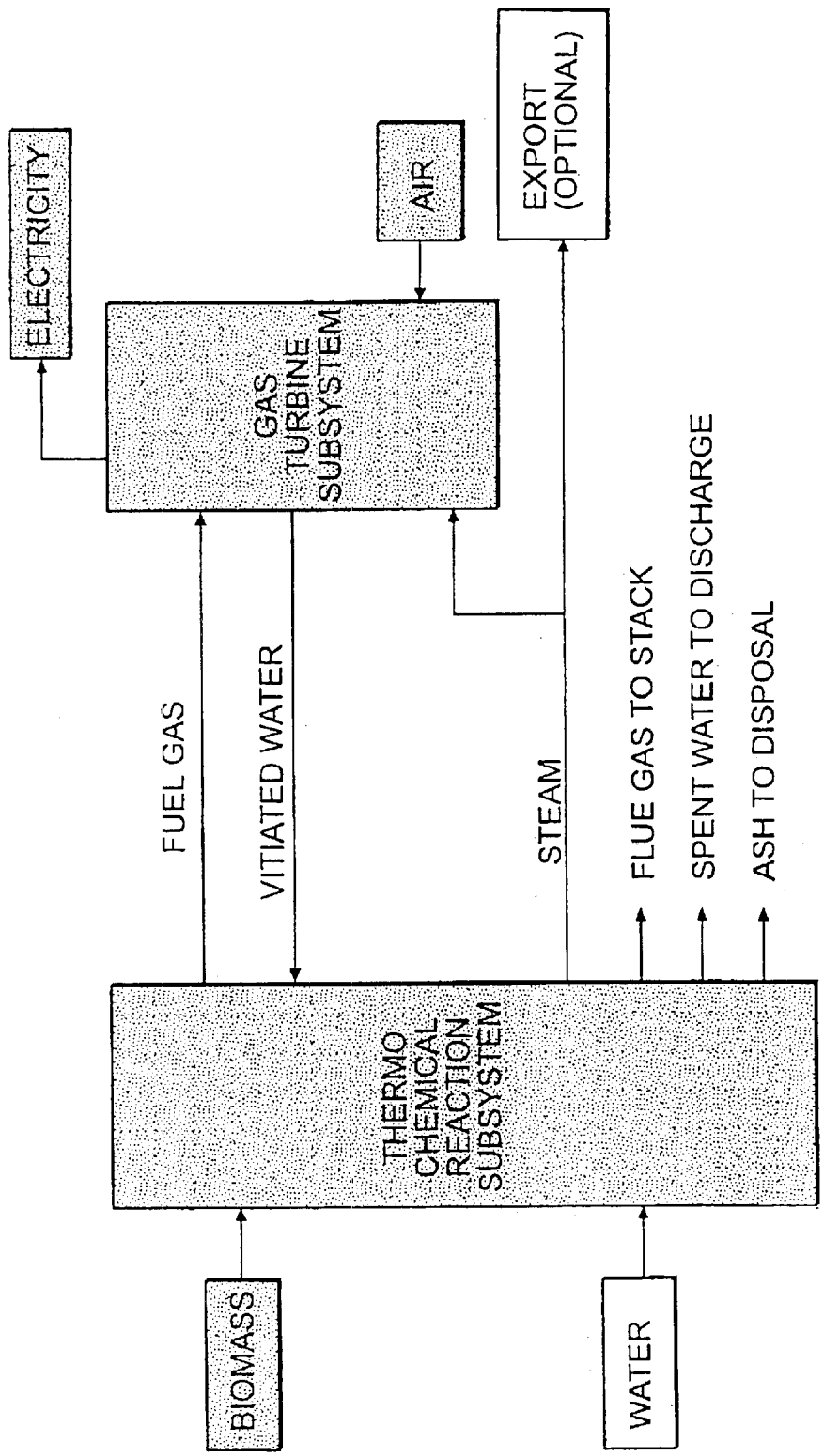
FIG. 2 is a block-flow diagram of the process of the present invention.
Figure 3:
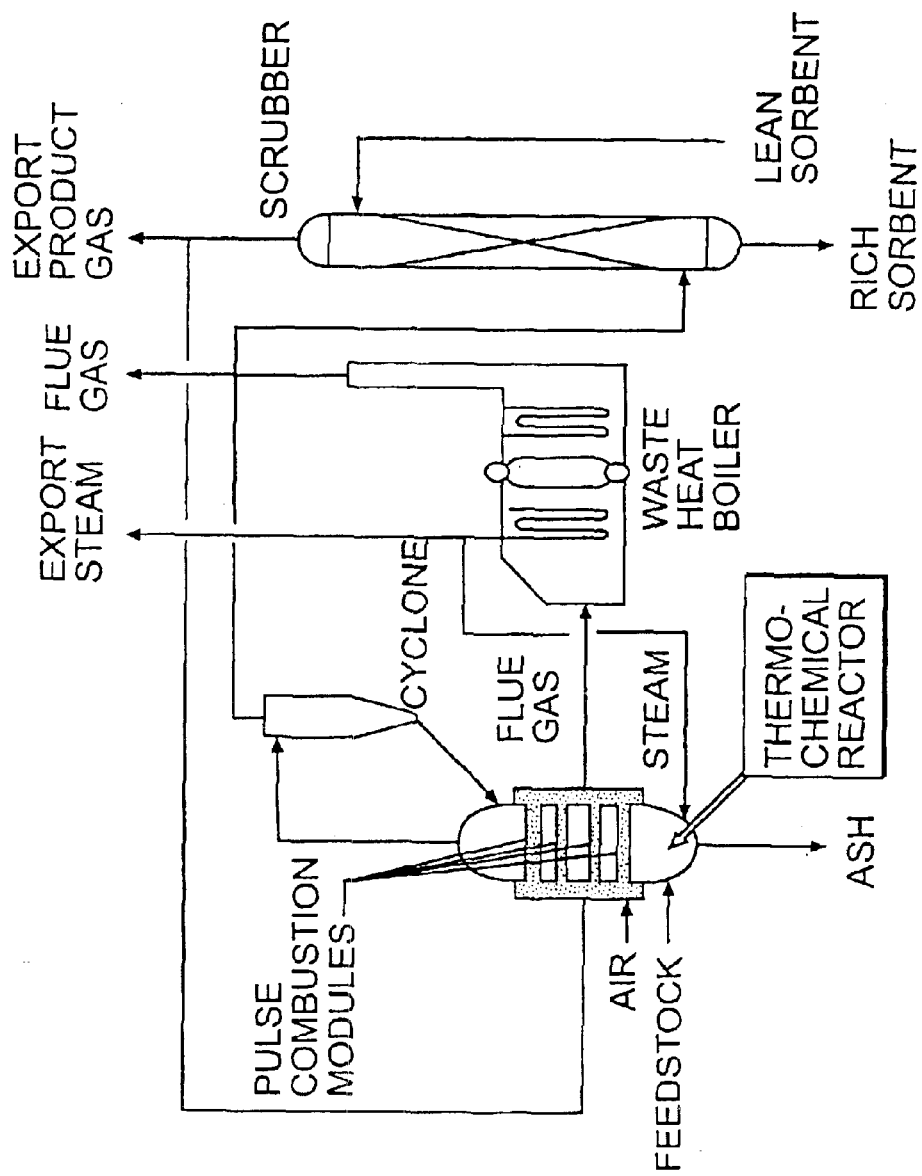
FIG. 3 is another block-flow diagram of a process made in accordance with the present invention.

According to the present invention, one embodiment of the thermomechanochemical system (see FIGS. 2 and 3) includes a fluidized bed reactor that is indirectly heated by multiple resonance tubes of one or more pulse combustion modules. Feedstock such as biomass, coal, sludge or spent liquor is fed to the reactor which is fluidized with superheated steam from a waste heat recovery boiler. The organic material injected into the bed undergoes a rapid sequence of vaporization and pyrolysis reactions. Higher hydrocarbons released among the pyrolysis products are steam cracked and partially reformed to produce low molecular weight species. Residual char retained in the bed is more slowly gasified by reaction with steam.

In one embodiment, the product gases are routed through a cyclone to remove bulk of the entrained particulate matter and are quenched and scrubbed in a venturi scrubber. A portion of the medium-Btu product gases are supplied to the pulse combustion modules and combustion of these gases provides the heat necessary for the indirect gasification process.

Accordingly, a system of the present invention integrates a thermochemical reaction subsystem with the gas turbine subsystem to generate electricity from biomass. The thermochemical reaction subsystem typically includes a pulse combustor, steam reformer, gas cleanup train, steam superheater, and heat recovery steam generator (HRSG). Part of the product gas generated by the steam reformer can be used in the pulse heaters and the remainder can be sent to the gas turbine subsystem for power generation. The fuel gas generated by the steam reformer generally undergoes one or more gas cleanup steps in order to meet the fuel gas cleanliness requirements of the gas turbine and comply with the environmental regulations. The gas turbine subsystem typically includes an air compressor, turbine, and generator.

An integrated, modular and cost-effective thermomechanochemical system of the system can offer the ensuing benefits when used for biopower generation:

enable the electrification of remote rural areas in the U.S. and in the rest of the world and power rural development;

enhance the utilization of renewable energy and thereby refrain from aggravating the global climate change;

provide a "green" technology for markets which have non-fossil mandates;

cater to power demand, especially in local areas of developing countries which lack premium fuel and have limited biomass supply due to short economical transportation radius;

aid the disposal of agricultural and livestock wastes and residues in an environmentally non-intrusive or minimally intrusive manner;

facilitate the cleanup of areas with radioactive/chemical contamination, meet electrical demand and foster economic growth by gainfully employing phytoremediation and thermomechanochemical conversion;

motivate and ease the development of a companion system capable of operating on logistic middle distillate fuels for defense applications including remote radar and communication stations and tactical mobile ground support sites; and significantly lower life-cycle maintenance requirements due to fewer moving parts.

Several emerging biomass power generation technologies are under development and marching towards commercialization. These include Integrated Gasification Combined Cycle (IGCC) power systems for biomass and black liquor and Stirling engine based power systems. The former systems are typically large (>50 MWe) while the latter systems are generally small (<10 KW$_e$). To enable fair comparisons of the performance of the IGCC systems with the performance of the proposed system, the analysis for the feedstock (wood) was selected to correspond to those used by the referenced investigators. The analysis for wood is presented in Table 1. These analyses were used in the computer simulations performed for system integration.

TABLE 1

BIOMASS ANALYSIS
Wisconsin Maple - Craig and Mann, NREL
Ultimate Analysis
Weight %, Dry

| | |
|---|---|
| Carbon | 49.54 |
| Hydrogen | 6.11 |
| Nitrogen | 0.10 |
| Sulfur | 0.02 |
| Chlorine | 0.00 |
| Ash | 0.50 |
| Oxygen | 43.73 |
| HHV, Btu/lb, Dry | 8,476 |
| Moisture, %, as received | 38 |

In one embodiment of the present invention, the thermomechanochemical system typically includes the following subsystems:

a biomass handling and feeding subsystem,
a pulse combustor steam reformer,
a steam superheater,
a fuel gas heat recovery steam generator (e.g. HRSG #1),
a fuel gas cleanup train that can contain, for example, a Venturi/gas cooler or H$_2$S absorber or ammonia absorber
a fuel gas compressor,
heat exchangers (e.g. Heat Exchangers I and II) and a heat recovery steam generator (e.g. HRSG #2),
a bed solids handling and storage subsystem, and
a gas turbine power generation subsystem A biomass handling and feeding subsystem of the present invention can incorporate storage, preparation, drying and feeding steps. If the biomass feedstock is in bulk form, it may need to be shredded or chopped to not exceed 2 inches in all 3 dimensions. Also, if necessary, it can be dried.

A steam reformer of the present invention is generally a bubbling bed fluidized with superheated steam. Preferably, the steady-state bed maintains a mean particle size of 250 to 350 microns and is comprised primarily of inert material, such as sand or alumina, and some residual carbon. Superheated fluidization steam can be supplied to the distribution headers and bubble caps with sufficient pressure drop to maintain uniform fluidization across the cross-section of the vessel.

In addition, resonance tubes (or heat exchanger tubes) of a combustion device such as a pulsed heater module of the present invention typically serve as efficient sources of heat supply to support the endothermic steam-reforming reaction of the biomass. The resonance tubes can be mounted perpendicular to the fluidization steam flow to enhance the heat transfer between the resonance tube walls and the fluid-bed particles.

In general, utilization of the pulsed heater can decrease the required surface area for heat transfer and reduce the size and capital cost of the reformer.

Figure 4:
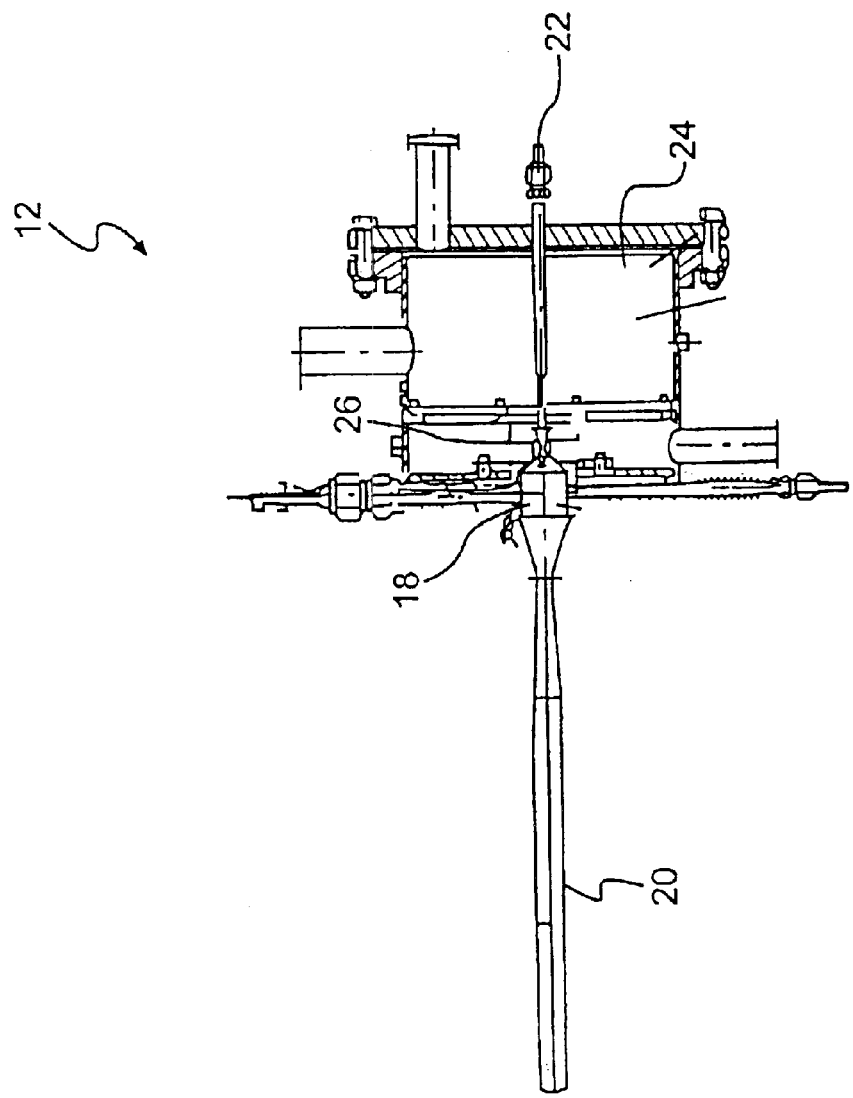
FIG. 4 is a plan view of a pulse combustion device that may be used in the process of the present invention.

Referring to FIG. 4, one embodiment of a pulse combustion device generally 12 is shown. Pulse combustion device 12 includes a combustion chamber 18 in communication with a resonance tube 20. Combustion chamber 18 can be connected to a single resonance tube as shown or a plurality of parallel tubes having inlets in separate communication with the pulse combustion chamber. Fuel and air are fed to combustion chamber 18 via a fuel line 22 and an air plenum 24. Pulse combustion device 12 can burn either a gaseous, a liquid or a solid fuel.

In order to regulate the amount of fuel and air fed to combustion chamber 18, pulse combustion device 12 can include at least one valve 26. Valve 26 is preferably an aerodynamic valve, although a mechanical valve or the like may also be employed.

During operation of the pulse combustion device 12, an appropriate fuel and air mixture passes through valve 26 into combustion chamber 18 and is detonated. During start up, an auxiliary firing device such as a spark plug or pilot burner is provided. Explosion of the fuel mixture causes a sudden increase in volume and evolution of combustion products which pressurizes the combustion chamber. As the hot gas expands, preferential flow in the direction of resonance tube 20 is achieved with significant momentum. A vacuum is then created in combustion chamber 18 due to the inertia of the gases within resonance tube 20. Only a small fraction of exhaust gases are then permitted to return to the combustion chamber, with the balance of the gas exiting the resonance tube. Because the pressure of combustion chamber 18 is then below atmospheric pressure, further air-fuel mixture is drawn into the combustion chamber 18 and auto-ignition takes place. Again, valve 26 thereafter constrains reverse flow, and the cycle begins anew. Once the first cycle is initiated, operation is thereafter self-sustaining.

Pulse combustion devices as described above regulate there own stoichiometry within their ranges of firing without the need for extensive controls to regulate the fuel feed to combustion air mass flow rate ratio. As the fuel feed rate is increased, the strength of the pressure pulsations in the combustion chamber increases, which in turn increases the amount of air aspirated by the aerodynamic valve, thus allowing the combustion device to automatically maintain a substantially constant stoichiometry over its desired firing range.

Pulse combustion device 12 produces a pulsating flow of combustion products and an acoustic pressure wave. In one embodiment, the pulse combustion device produces pressure oscillations or fluctuations in the range of from about 1 psi to about 40 psi and particularly from about 1 psi to about 25 psi peak to peak. These fluctuations are substantially sinusoidal. These pressure fluctuation levels are on the order of a sound pressure range of from about 161 dB to about 194 dB and particularly between about 161 dB and about 190 dB. Generally, pulse combustion device 12 can have an acoustic pressure wave frequency of from about 50 to about 500 Hz and particularly between about 50 Hz to about 200 Hz. Generally, the temperature of the combustion products exiting the resonance tube 20 in this application will range from about 1200 degrees F. to about 2000 degrees F.

The biomass used in the present invention can be wet or dried. If the biomass is wet, it can be dried in an indirect dryer and injected into the reformer.

A steam reformer subsystem of the present invention can also include a superheater to preheat the fluidization steam before it enters the reformer. In one embodiment, the superheater employs a portion of the sensible heat in the fuel gas stream to superheat the steam. This reduces the heat load in the reactor, thereby reducing the number of heater modules required for a specified biomass through put. According to the present invention, solids separation and return can be accomplished in the steam reformer subsystem by convention solid separation devices, such as high efficiency, low maintenance cyclones. The designs employed for these components may be identical to those that are used in catalytic crackers used for years by the refinery industry. A cyclone can efficiently capture small particles and return them to the bed for inventory control and additional reaction.

Upon exiting a particulate cyclone, the product gas can also be partially recirculated to the bed through a steam eductor, in one embodiment, while the bulk of the product gas is processed through the steam superheater and a heat recovery steam generator (shown as HRSG #1 in FIG. 1). The heat absorbed by the water cooling of the pulsed-heater tube sheet also contributes to the steam produced in the HRSG #1. In one embodiment, steam from HSRG #1 can also supplement steam generated from a waste heat boiler (shown as HRSG #2 in FIG. 1).

In accordance with the present invention, a portion of the clean product gas can also be recycled for firing in the pulsed heaters. In one embodiment, the flue gas leaving the pulsed heaters passes through two gas-to-gas heat exchangers (Heat Exchangers I and II), and then to the boiler (HRSG #2). HRSG #2 functions as a steam generator and as an economizer. HRSG#2 can generate medium pressure steam (such as about 330 psig) for biomass drying and high pressure steam for superheating. Typically, the superheated steam is used primarily for fluid bed fluidization. Any excess steam can be sent to the gas turbine combustor for injection into the gas turbine to boost power output.

The present invention also generally requires the use of a gas cleanup system, which functions to remove entrained particulate matter, $H_2S$ and ammonia, if necessary, from the product gas. In one embodiment, the gas exiting HRSG #1 is quenched, saturated with water and scrubbed of particulate matter when contacted with recirculated fluid in a high-energy venturi. A condensate bleed stream is discharged from the plant. The gas is then further cooled by countercurrent contact with recirculated liquid in a packed tower. The recirculated liquid is cooled in a non-contact heat exchanger. A bleed stream is also discharged from the plant. Final scrubbing may be performed, if needed, in a countercurrent absorber with caustic or other absorbent to remove $H_2S$ and/or ammonia from the product gas. The resulting solution may be further processed to recover the chemicals.

In general, a major portion of the fuel gas generated by the thermochemical reaction subsystem can be compressed to a pressure slightly greater than the turbine inlet pressure and thereafter supplied to the gas turbine combustor. In one embodiment, air is also typically compressed and preheated in Heat Exchanger II and supplied to the gas turbine combustor as an oxidant.

The products of combustion, along with any excess steam from the superheater, can then be injected into the gas turbine coupled with a generator to produce electricity. In one embodiment, a small portion of the flue gas leaving the gas turbine is preheated in Heat-Exchanger I to a temperature near fluid bed temperature and used as vitiated air in the pulsed heaters.

The fuel gas generally combusts in the pulse heaters and supplies the heat for the endothermic reactions in the fluid bed. In one embodiment, the flue gas exiting the pulse heaters transfer heat to be vitiated air in Heat Exchanger I and then facilitates final preheat of the compressed air in Heat Exchanger II. The flue gas from the gas turbine provides for the initial preheating of the compressed air in Heat Exchanger II.

A system of the present invention as described above maximizes the energy input to the gas turbine cycle, minimizes fuel gas use for pulse heating and avoids the need for a bottoming steam cycle. Computer analysis indicates the net electrical efficiency to be on the order of at least 20 percent on LHV basis for a 1 to 5 $MW_e$ biopower system. This is a significant improvement in energy conversion efficiency in addition to the minimal environmental impact as compared to the state of the art in small-scale biomass power systems.

An example of design parameters for one embodiment of a steam reformer system of the present invention are furnished in Table 2 for reference. Because there is no built-in catalyst as in black liquor application, the bed temperature typically should be higher (~1,475° F.) for wood to achieve high carbon conversion. Experimental data from the Process Development Unit indicate a total carbon conversion of about 98 percent in the 1,450° F. to 1,500° F. temperature range.

Some biomass feedstocks, such as switch grass, contain a higher proportion of alkali (sodium and potassium), which may lead to the formation of eutectics or low-melting compounds and bed agglomeration and defluidization. To minimize this, the bed material can comprise alumina or magnesium oxide and not sand (to minimize the formation of silicates) for those feedstocks, allowing the fluidization velocity to be higher (~2 ft/s).

Design calculations for the parameters of the embodiment depicted in Table 2 indicated that the nominal wood throughput was 3.35 dry tons/h for a two 253-tube pulse heater configuration.

TABLE 2

| NOMINAL DESIGN PARAMETERS Steam Reformer | |
| --- | --- |
| Feedstock | Wood |
| Fluid Bed Temperature, ° F. | 1,475 |
| Freeboard Pressure, psig | 7.5 |
| Feed Rate, dry TPH | 3.35 to 3.5 |
| Fluidization Velocity, ft/s | 1.5 to 2 |
| Fluidization Medium | Steam |
| Dense Fluid Bed Flow Area, $ft^2$ | 62 |
| Number of Pulse Heater Modules | 2 |
| Number of Resonance Tubes/Heater | 253 |

The composition of the fuel gas exiting the gas cleanup train of the embodiment depicted in Table 2 is shown in Table 3:

TABLE 3

| Component | (Volume %) |
|---|---|
| $H_2$ | 49.95 |
| CO | 22.70 |
| $CO_2$ | 14.93 |
| $H_2O$ | 9.68 |
| $N_2$ | 0.00 |
| $CH_4$ | 2.29 |
| $C_2H_4$ | 0.30 |
| $C_2H_6$ | 0.07 |
| $C_3H_6$ | 0.02 |
| $C_3H_8$ | 0.00 |
| $NH_3$ | 0.07 |
| $H_2S$ | 0.01 |
| HHV, Btu/scf | 265 |

The net power output was estimated to be about 4.7 $MW_e$ and the net electrical efficiency is about 30.2% on LHV basis.

The emissions projected for one embodiment of a thermomechanochemical system of the present invention are listed in Table 4. The emissions are listed on the basis of 1b/MMBtu to enable comparison with the proposed new environmental regulations (one-tenth of New Source Performance Standards or 1/10 NSPS). Due to steam reforming and fuel gas cleanup, the emissions were all very low and are significantly lower than the proposed regulations.

TABLE 4

PROJECTED EMISSIONS Lb/MMBtu

| | Wood | 1/10 NSPS |
|---|---|---|
| CO | 0.03 | — |
| $SO_2$ | 0.04 | 0.12 |
| $NO_x$ | 0.05 | 0.06 |
| Particulates | <0.0001 | 0.003 |

Referring to FIG. 1, one embodiment of a system made in accordance with the present invention is illustrated. As shown, the system includes a biomass feed 30 which, if necessary, can be designed to shred or chop the materials entering the system. The system can also include a dryer 32 as shown for removing moisture.

Once prepared, the biomass materials are then fed to a fluidized bed 34 which is heated by one or more pulse combustion devices 12. As shown, in this embodiment, the fluidized bed 34 is heated by three pulse combustion devices 12 which each include multiple resonance tubes. The fluidized bed 34 is fluidized with superheated steam and contains particulate material, such as alumina, sand, a metal oxide such as magnesium oxide, or any other suitable material. In the fluidized bed 34, the biomass materials undergo endothermic reactions and are reformed into a product gas stream containing lower molecular weight hydrocarbons.

Upon exiting the fluidized bed 34, the product gas stream is fed to a cyclone 36 for removing particulate matter and then ultimately fed to a gas turbine generally 38. Specifically, the product gas stream is first compressed by a gas compressor 42 and fed to a combustor 40. Air is fed to an air compressor 44 and combined with the product gas stream in the combustor 40. The energy from combustion is then used to rotate a turbine 46 which is in communication with a generator 48. Generator 48 then produces electricity.

Prior to being fed to the gas turbine 38, however, the product gas stream can be used to generate steam for use in the fluidized bed in a heat recovery steam generator 50. The steam that is generated in the steam generator 50 is also super heated by the product gas stream in a heat exchanger 51.

From the steam generator 50, the product gas stream is fed to a venturi/gas cooler 52 and cooled.

Besides the product gas stream, the flue gas stream exiting the pulse combustion devices 12 are also further used in the system. As shown, the flue gas stream from the pulse combustion devices is fed to a first heat exchanger 54 and to a second heat exchanger 56. Heat exchanger 54 is used to heat a portion of the combustion products exiting the gas turbine 38. Heat exchanger 56, on the other hand, is used to preheat air entering the combustor 40.

From the heat exchanger 56, the flue gas stream of the pulse combustion devices is then fed to a second heat recovery steam generator 58. Steam generator 58 generates steam and acts as an economizer. Particularly, as shown, steam exiting the steam generator 58 can be fed to the dryer 32 for drying the biomass materials. Steam from the steam generator 58 is also fed to the superheater 51 for use in the fluidized bed 34.

Upon exiting the steam generator 58, the flue gas is then fed to a stack and released to the environment if desired.

As shown, the fluidized bed solids can be periodically collected if desired. Depending upon the biomass feed materials, the bed solids may contain useful components that can be collected and reused.

EXAMPLE 1

Early system tests were performed using three different biomass feeds: pistachio shells, wood chips, and rice hulls; two different sludge waste products from a recycle paper mill; and a Kraft mill sludge (the two sludge wastes differed primarily in their plastic content); Refuse Derived Fuel (RDF); and dried Municipal Sludge Wastewater (MSW). The waste paper sludge was obtained from a mill located in Northern California. The sludge fraction was composed of short fiber and plastic reject material that is recovered from a clarifier. These sludge wastes were representative of high moisture waste materials that are generated in similar mills located throughout the United States. Table 5 summarizes the operating conditions for the various test runs in the bench-scale unit. Temperatures were varied over the range of approximately 1215° F. to 1450° F. Steam-to-biomass ratios varied from approximately 0.75 to 2.6. Test run durations typically ranged from 4 to 10 hours. No process operating problems were encountered for any of the runs, including those with rice hulls that have a high ash content and low ash fusion point.

TABLE 5

OPERATING AND PROCESS CONDITIONS FOR BIOMASS WASTE TEST RUNS

| Feedstock | Temp (° F.) | Average Feed Rate (lb/h) | Steam Rate (lb/h) | Steam To Biomass (lb/lb) | Total Feed (lbs) |
|---|---|---|---|---|---|
| Pistachio Shells | 1,317 | 35.5 | 26.0 | 0.7 | 337.0 |
| Pistachio Shells | 1,216 | 30.6 | 31.5 | 1.0 | 115.3 |
| Wood Chips | 1,286 | 22.9 | 31.4 | 1.4 | 205.7 |
| Rice Hulls | 1,326 | 30.8 | 26.0 | 0.8 | 185.5 |
| Recycle Paper Mill Sludge | 1,250 | 17.6 | 36.5 | 2.1 | 118.8 |
| Kraft Mill Sludge Waste | 1,250 | 17.6 | 36.5 | 2.1 | 299.6 |
| RDF (sand bed) | 1,450 | 11.0 | 29.0 | 2.6 | 66.0 |

The resultant gas compositions from the various biomass waste feedstocks are summarized in Table 6. The methane content appears to be relatively constant (5 to 12%) over the range of feeds and processing conditions tested. Higher hydrocarbons show a decreasing trend with increasing temperature and a concomitant increase in hydrogen yields. The ratio between carbon monoxide and carbon dioxide appears relatively constant. The dry gas heating value typically ranged from 370 to 448 Btu/scf.

TABLE 6

GAS COMPOSITIONS MD PRODUCT YIELDS FOR BIOMASS AND MILL SLUDGE TESTS CONDUCTED IN PULSE-ENHANCED INDIRECT STEAM REFORMER

| Composition (Vol. %) | Pistachio Shells | Pistachio Shells | Wood Chips | Rice Hulls | Recycle Mill Fiber Waste | Recycled Waste Paper W/Plastics | Kraft Mill Sludge | RDF Sand Bed | MSW Sand Bed |
|---|---|---|---|---|---|---|---|---|---|
| $H_2$ | 37.86 | 35.04 | 48.11 | 42.83 | 38.86 | 50.50 | 52.94 | 45.54 | 55.21 |
| CO | 18.84 | 23.43 | 22.91 | 19.67 | 23.34 | 19.26 | 11.77 | 25.26 | 28.10 |
| $CO_2$ | 28.73 | 25.20 | 20.18 | 24.40 | 23.27 | 20.10 | 21.94 | 14.51 | 5.95 |
| $CH_4$ | 10.65 | 11.31 | 8.32 | 11.56 | 8.31 | 8.42 | 8.95 | 8.30 | 5.00 |
| $C_2$ | 3.92 | 5.02 | 0.48 | 1.54 | 6.40 | 1.72 | 3.00 | 6.38 | 5.74 |
| Total | 100.00 | 100.00 | 100.00 | 100.00 | 100.18 | 100.00 | 98.60 | 99.99 | 100.00 |
| HHV (Btu/scf) | 370 | 406 | 329 | 367 | 412 | 364 | 372 | 418 | 374 |
| TEMP. (° F.) | 1317 | 1216 | 1286 | 1326 | 1250 | 1326 | 1250 | 1450 | 1410 |

EXAMPLE 2

In another project used to evaluate the low $NO_x$ potential of natural gas-fired pulse combustors, burners of the present invention were tested in three different configurations: a pulse burner (0.76 to 5.58 million Btu/hr firing rate range) retrofitted to a Cleaver-Brooks boiler and two versions of a pulse combustor from 2 to 9 million Btu/hr including a 72-tube heater/heat exchanger bundle of the type used in the steam-reforming process. In all the cases, the $NO_x$ emissions measured were less than 30 ppm @ 3% $O_2$. Emissions data from a pilot-scale 72-tube heater/heat exchanger bundle that had already accumulated more than 5,000 hours of operation was measured by several instruments and is presented in Table 7.

TABLE 7

EMISSIONS DATA FROM THE 72-TUBE PILOT-SCALE PULSE HEATER TESTS

| FIRING RATE (Btu/hr) | FLUE GAS READINGS O2 (%) | FLUE GAS READINGS NOx (ppm) | CORRECTED AT 3% O2 NOx (ppm) | FLUE READINGS O2 (%) | FLUE READINGS NOx (ppm) | CORRECTED AT 3% O2 NOx (ppm) | FLUE GAS READINGS O2 (%) | FLUE GAS READINGS NOx (ppm) | CORRECTED AT 3% O2 NOx (ppm) |
|---|---|---|---|---|---|---|---|---|---|
| 1.73E + 06 | 13.9 | 2 | 5.1 | 13.8 | 6 | 15.0 | 13.6 | 0 | 0 |
| 1.74E + 06 | 16.1 | 1 | 3.7 | 16.3 | 0 | 0 | 15.9 | 0 | 0 |
| 3.39E + 06 | 13.4 | 2 | 4.7 | 13.6 | 4 | 9.7 | — | 0 | 0 |
| 3.39E + 06 | 14.8 | 1 | 2.9 | 16.7 | 0 | 0 | 16.3 | 0 | 0 |
| 3.39E + 06 | 16.5 | 1 | 4.0 | 9.4 | 11 | 17.1 | — | — | — |
| 5.10E + 06 | 8.8 | 17 | 25.1 | 8.8 | 22 | 32.5 | | — | — |
| 5.10E + 06 | 11.1 | 14 | 25.1 | — | — | — | 8.6 | 16 | 23.2 |

In one embodiment of the present invention, it has been discovered that various advantages are achieved when the biomass material contains rice straw or other feedstocks rich in silica. It has been discovered that the silica in the rice straw or other feed stock can be recovered as a valuable byproduct.

Figure 5:
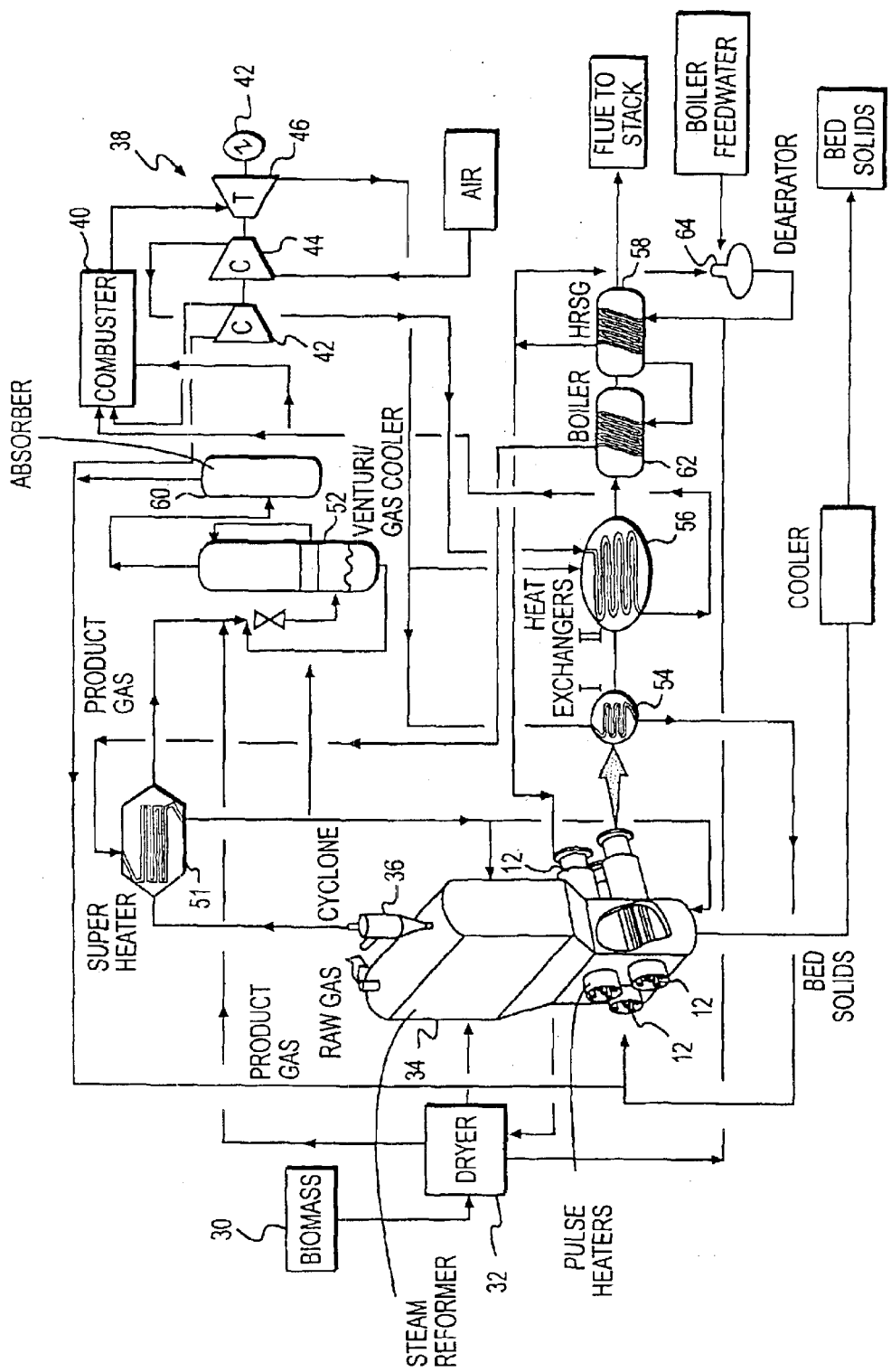
FIG. 5 is a schematic diagram of an alternative embodiment of a process made in accordance with the present invention.

Referring to FIG. 5, one embodiment of a system designed to process rice straw according to the present invention is shown. Like reference numerals similar to FIG. 1 have been used to identify similar elements. As shown, in this embodiment, the biomass materials 30 contain rice straw. If the rice straw is in bulk form, the straw may need to be shredded or chopped to not exceed two inches in length. As shown, the rice straw is fed to a fluidized bed in accordance with the present invention and converted into a product gas stream which is ultimately used to generate electricity via a gas turbine 38.

As opposed to the embodiment illustrated in FIG. 1, the system in FIG. 5 includes a steam generator 58 in conjunction with a boiler 62. Further, the system illustrated in FIG. 5 includes an absorber 60 for scrubbing the product gas stream and removing unwanted constituents. Boiler 62 is for generating steam that is fed to the superheater 51. The system further includes a de-aerator 64 for removing air from water fed to the steam generator.

In this embodiment, the bed solids are drained continuously to maintain bed height. The solids are cooled and stored. The silica in the rice straw is anticipated to be in an amorphous form with a composition of $SiO_x$ (X<2) due to the reducing environment in the steam reformer. Therefore, the bed solids are expected to become a valuable byproduct for the manufacture of silicon PV cells, wafers and chips.

The nominal design parameters for the steam reformer for a rice straw application are furnished in Table 8 below.

TABLE 8

NOMINAL DESIGN PARAMETERS
Steam Reformer

| | |
|---|---|
| Feedstock | Rice Straw |
| Fluid Bed Temperature, ° F. | 1,475 |
| Freeboard Pressure, psig | 8.0 |
| Fluidization Velocity, ft/s | 1.6 |
| Fluidization Medium | Steam |
| Dense Fluid Bed Flow Area, ft$^2$ | 62 |
| Number of Pulse Heater Modules | 2 |
| Number of Resonance Tubes/Heater | 253 |

Table 9 below shows the analysis for rice straw.

TABLE 9

ANALYSIS OF RICE STRAW

| | |
|---|---|
| Moisture, as received wt % | 8.67 |
| Ultimate Analysis (dry basis) | Wt % |
| Carbon | 39.6 |
| Hydrogen | 4.6 |
| Nitrogen | 0.7 |
| Sulfur | 0.11 |
| Chlorine | 0.26 |
| Ash | 18.3 |

TABLE 9-continued

ANALYSIS OF RICE STRAW

| | |
|---|---|
| Oxygen | 36.43 |
| HHV, Btu/lb | 6,492 |
| Ash Analysis | wt % ash |
| $SiO_2$ | 72.2 |
| $Al_2O_3$ | 0.1 |
| $Na_2O$ | 0.4 |
| $K_2O$ | 16.6 |

The estimated composition of the flue gas after the gas clean up train is shown in Table 10.

TABLE 10

COMPOSITION OF FUEL GAS AFTER GAS CLEANUP

| Component | (Volume %) |
|---|---|
| $H_2$ | 49.56 |
| CO | 23.20 |
| $CO_2$ | 16.36 |
| $H_2O$ | 7.65 |
| $N_2$ | 0.00 |
| $CH_4$ | 2.40 |
| $C_2H_4$ | 0.31 |
| $C_2H_6$ | 0.07 |
| $C_3H_6$ | 0.02 |
| $C_3H_8$ | 0.00 |
| $NH_3$ | 0236 |
| $H_2S$ | 0.00 |
| HHV, Btu/scf | 267 |

The emissions projected for the integrated system are listed in Table 11 below.

TABLE 11

PERFORMANCE SUMMARY

| | 1 MW$_e$ | 5 MW$_e$ |
|---|---|---|
| NOMINAL SIZE | | |
| Rice Straw Processing Rate, ton/day dry | 33.0 | 112.1 |
| Gas Turbine Net Power, MW$_e$ | 1.20 | 4.87 |
| Plant Power Consumption, MW$_e$ | 0.07 | 0.20 |
| Net Electrical Efficiency | | |
| - % HHV Basis | 21.6 | 26.3 |
| - % LHV Basis | 23.1 | 28.1 |
| Byproduct Ash Drain Rate, lb/h | 524 | 1,782 |
| Silicon Content in Ash, % | 31 | 31 |
| EMISSIONS | | |
| No$_x$, lb/MBtu | 0.11 | 0.14 |
| SSO$_2$, lb/MBtu | 0.02 | 0.02 |
| Participates, lb/MBtu | <0.0001 | <0.0001 |
| CO, lb/MBtu | 0.03 | 0.03 |
| VOC, lb/MBtu | 0.003 | 0.003 |

Besides rice straw, in another embodiment, the process of the present invention is used to process farm animal waste. In particular, the process of the present invention can be used to process farm animal waste in a manner that not only produces steam, but also produces nutrients, such as potassium, phosphorous, and nitrogen which are recovered as fertilizer-grade byproducts.

The intensive production of poultry and livestock (billions of chickens and millions of cattle and pigs annually in the United States) has increased the generation of manure and aggravated the wasted disposal problem.

For instance, a 1000 pound dairy cow excretes about 82 pounds of manure per day containing 0.4 pounds of nitrogen, 0.17 pounds of phosphate and 0.32 pounds of potash and 1000 broilers excrete approximately 140 pounds of manure each day containing 2.4 pounds of nitrogen, 1.23 pounds of phosphate and 0.9 pounds of potash. The poultry manure is typically drier and richer in nutrients in comparison to livestock manure. Therefore, poultry manure affords greater energy and nutrient recovery per ton and in turn the potential for greater cost-effectiveness. It should be understood, however, that the process of the present invention can be used to process any type of animal waste.

It is believed that power plants made according to the present invention in the 20 kW to 100 kW size range are best suited for processing animal waste. For a superior performance, the steam reformer fluidized bed should operate at about 1500 degrees F.

It is a vision that systems made according to the present invention will permit many modular units to be conveniently located near animal farms. Distributed power generation has been shown to enhance grid reliability by providing many geographically diverse power sources regardless of type. In addition, the versatility and fuel flexibility of the steam reformer permits continued power generation at affordable or market competitive rates by switching feed stocks according to availability and price.

Figure 6:
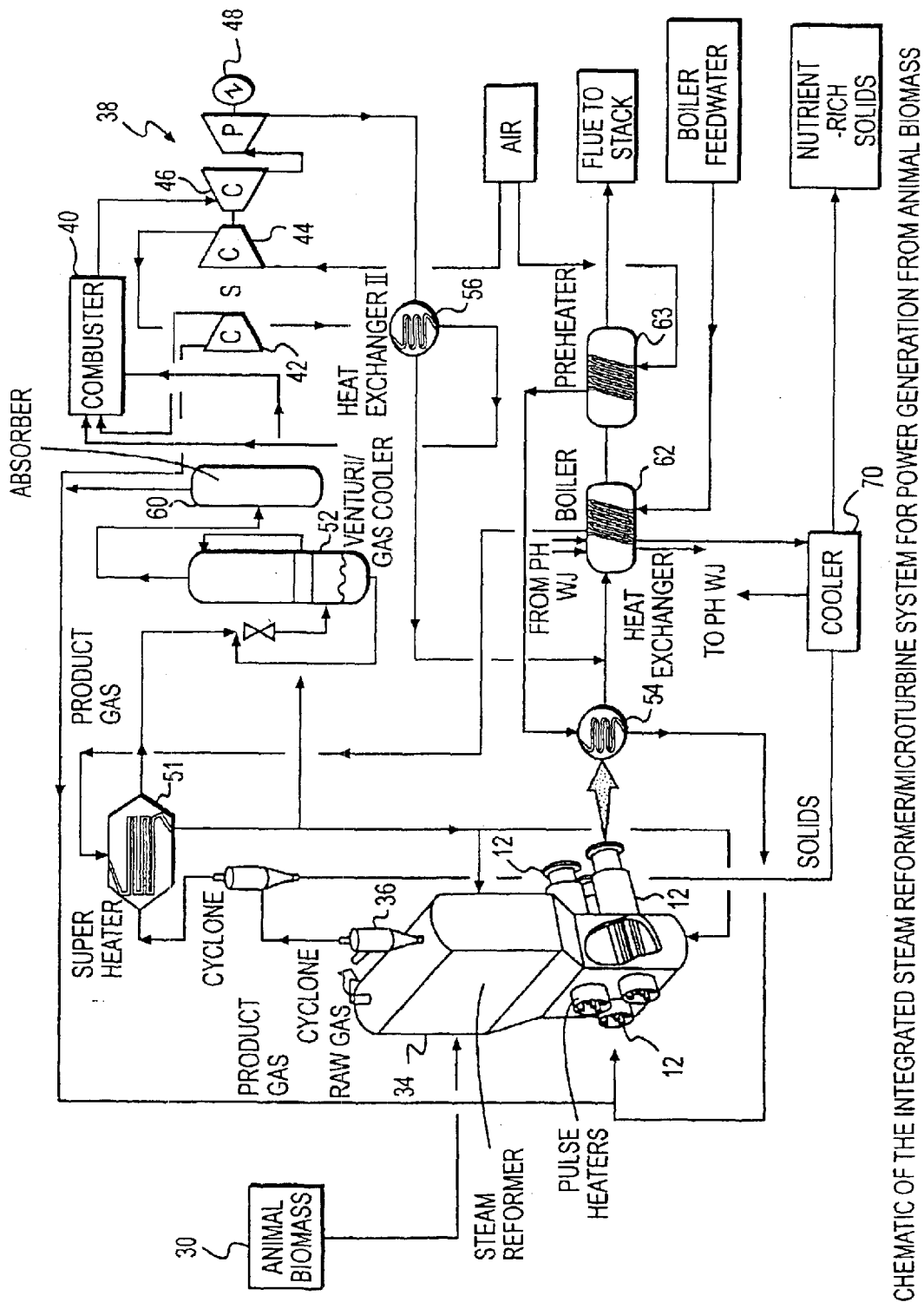
FIG. 6 is still another alternative embodiment of a schematic diagram of a process made in accordance with the present invention.

A schematic diagram of one embodiment of a system made according to the present invention for producing electricity from animal waste is illustrated in FIG. 6. A trial was run similar to the system illustrated in FIG. 6 using chicken waste as the feed material.

When operating the system, there are four variables of relevance including fluid bed temperature, steam fluidization velocity, gas residence time, and manure composition. Bed temperature impacts heat and mass transfer and reaction kinetics and in turn influences product gas composition and yield, carbon conversion and residuals solids composition. Steam fluidization velocity affects fluidization quality, fines elutriation, steam to carbon ratio and tendency for agglomeration. Gas residence time depends upon fluidizing velocity, dense bed height and freeboard height and impacts product gas composition and yield, carbon conversion, residual solids composition and tendency for agglomeration. During testing, fluid bed temperature was the only parameter that was varied.

The following is a short description of the start up and operation of the reactor. The cooling air to the feeder auger and nitrogen flow to the hopper are started. An initial bed material (17.5 pounds of magnesium oxide in this example) is loaded into the reactor through the port in the top flange. Initial representative samples of this bed material and waste are then taken. At the beginning of a test, the bed is fluidized by utilizing nitrogen (about 50 SCFH). At that time, the heaters are set to a specified temperature and reactor preheating begins. The gas preheater temperature is set to 1000 degrees F. When the bed temperature approaches 800 degrees F., the boiler-superheater temperature is set to 1000 degrees F. When the superheater temperature reaches about 800 degrees F., fluidization is switched from nitrogen to superheated steam. The water supply rate to the boiler-superheater is precisely provided by a high pressure metering pump. An oxidizer is started during the preheating stage and prior to switching to super-heated steam. When the reactor reaches the specified final bed temperature, the chicken waste feed is started at a specific design feed rate.

Table 12 below provides a summary of the operating conditions for the three tests.

TABLE 12

TEST PROGRAM SUMMARY

| | | Test Numbers | | |
|---|---|---|---|---|
| | | 1 | 2 | 3 |
| Distributor Plenum Mean Temperature | F | 877 | 863 | 1050 |
| Bed Mean Temperature | F | 1106 | 1296 | 1504 |
| Freeboard Mean Temperature | F | 828 | 1074 | 1122 |
| Distributor Plenum Pressure | psig | 4 | 4 | 2.5 |
| Freeboard Pressure | psig | 0 | 0 | 0 |
| Water Flow for Fluidizing Steam | ml/min | 5.2 | 4.5 | 4.3 |
| Fluidizing Nitrogen | l/min | 2.36 | 2.36 | 0 |
| Feeder Bin Purge Nitrogen | l/min | 0.57 | 0.57 | 0.57 |
| Waste Feed Rate | g/min | 6.5 | 5.6 | 5.0 |
| Superficial Fluidization Velocity | ft/s | 0.15 | 0.15 | 0.14 |

It was discovered that the initial bed is all magnesium oxide and white in color. The bed samples at the end of the 1100 degrees F. and 1300 degrees F. tests were dark indicating leftover carbon. The bed following the 1500 degree test, however, had a few specks of gray and exhibited a slight tan. This suggests excellent carbon conversion at 1500 degrees F.

Complete laboratory analysis of all the samples were made only for the 1500 degrees F. test. Only the initial and final bed samples were analyzed for the 1100 degree F. and 1300 degree F. tests. All of the chemical analyses were performed by an outside laboratory. The results are presented in Tables 13 through 22. Tables 13 through 20 correspond to the 1500 degree F. test while Tables 18 and 21 relate to the 1100 degree F. test and Tables 18 and 22 refer to the 1300 degree F. test.

TABLE 13

PRODUCT GAS COMPOSITION AND HHV

| | | Vol, % |
|---|---|---|
| Hydrogen | H2 | 55.29% |
| Oxygen | O2 | 0.00% |
| Nitrogen | N2 | 0.00% |
| Methane | CH4 | 6.16% |
| Carbon Monoxide | CO | 6.12% |
| Carbon Dioxide | CO2 | 28.51% |
| Ethylene | C2H4 | 3.35% |
| Ethane | C2H6 | 0,13% |
| Acetylene | C2h2 | 0.16% |
| Hydrogen Sulfide | H2S | 0.28% |
| Propylene | C3H6 | 0.00% |
| Propane | C3H8 | 0.00% |
| HHV | Btu/dry scf | 322.4 |
| | Btu/g dry feed | 13.1 |
| | Btu/lb dry feed | 5,936 |
| | Btu/Btu in dry feed | 1.2 |

TABLE 14

ELEMENTAL BALANCE

| Element | In g/h | Out g/h | Closure % |
|---|---|---|---|
| C | 78.45 | 66.87 | 85.2 |
| H | 55.30 | 57.50 | 104.0% |
| O | 410.59 | 428.37 | 104.3% |

TABLE 14-continued

ELEMENTAL BALANCE

| Element | In g/h | Out g/h | Closure % |
|---|---|---|---|
| N | 7.84 | 3.51 | 44.7% |
| S | 1.46 | 1.37 | 93.8% |
| K | 5.33 | 2.62 | 49.1% |
| P | 3.54 | 0.86 | 24.3% |
| C | 2.68 | 2.48 | 92.7% |
| Ash | 88.28 | 90.28 | 102.3% |

TABLE 15

CONVERSION AND RELEASE DATA

|  | Min | Max |
|---|---|---|
| Carbon conversion | 98% | 99% |
| Sulfur release | 84% | 89% |
| Chlorine release | 91% | 98% |
| Nitrogen release | 41% | 92% |

TABLE 16

VOC IN THE PRODUCT GAS STREAM

| VOC | Mg/g of dry feed |
|---|---|
| Acetone | 0.0067 |
| Acrylonitrile | 0.0073 |
| Benzene | 0.0555 |
| Toluene | 0.0130 |
| Xylenes | 0.0008 |
| Styrene | 0.0048 |
| Naphthalene | 0.0242 |
| Acetonitrile | 0.0058 |
| Thiophene | 0.0016 |
| Other | 0.0229 |
| Total VOC | 0.143 mg/g of dry feed |
|  | 0.065 g/lb of dry feed |

TABLE 17

SVOC IN THE PRODUCT GAS STREAM

| SVOC | mg/g of dry feed |
|---|---|
| Phenol | 0.0293 |
| Naphthalene | 0.9512 |
| Fluorene | 0.1353 |
| Acenaphthene | 0.3051 |
| Phenanthrene | 0.2256 |
| Other | 1.7539 |
| Total | 3.40 mg/g of dry feed |
|  | 1.54 g/lb of dry feed |

TABLE 18

BED COMPOSITION BEFORE AND AFTER THE TEST

| | Weight, g | | | | | |
|---|---|---|---|---|---|---|
| | Test 1 | | Test 2 | | Test 3 | |
| Elements | Before | After | Before | After | Before | After |
| C | 0 | 54.40 | 0 | 4.00 | 0 | 0.40 |
| H | 0 | 6.40 | 0 | 2.00 | 0 | 2.00 |
| O | 0 | 0.00 | 0 | 0.00 | 0 | 0.00 |
| N | 0 | 1.60 | 0 | 0.80 | 0 | 0.80 |
| S | 0 | 2.72 | 0 | 1.28 | 0 | 0..20 |
| K | 0 | 24.96 | 0 | 12.40 | 0 | 0.04 |
| P | 0 | 8.80 | 0 | 4.80 | 0 | 0.40 |
| Cl | 0 | 9.60 | 0 | 2.80 | 0 | 0.16 |
| Ash (including MgO) | 8000 | 8047 | 8000 | 8016 | 8000 | 8003 |
| TOTAL | 8000 | 8156 | 8000 | 8044 | 8000 | 8007 |

TABLE 19

COMPOSITION OF ELUTRIATED SOLIDS

| Elements | g/g dry feed |
|---|---|
| C | 0.0040 |
| H | 0.0002 |
| O | 0.0000 |
| N | 0.0002 |
| S | 0.0003 |
| K | 0.0105 |
| P | 0.0030 |
| Cl | 0.0096 |
| Ash | 0.3625 |
| Total | 0.3903 |

TABLE 20

NUTRIENT DISTRIBUTION

| | | Gas | Catch | Bed |
|---|---|---|---|---|
| N | min | 41% | 1% | 3% |
|  | max | 92% | 2% | 7% |
| K | min | 0% | 49% | 0% |
|  | max | 0% | 100% | 0% |
| P | min | 0% | 21% | 3% |
|  | max | 0% | 87% | 13% |

TABLE 21

PRODUCT GAS COMPOSITION AND YIELD FOR TEST 1 (1,000° F.)

| | | |
|---|---|---|
| Hydrogen | $H_2$ | 47.63% |
| Oxygen | $O_2$ | 0.00% |
| Nitrogen | $N_2$ | 0.00% |
| Methane | $CH_4$ | 4.31% |
| Carbon Monoxide | CO | 12.68% |
| Carbon Dioxide | $CO_2$ | 30.05% |
| Ethylene | $C_2H_4$ | 2.33% |
| Ethane | $C_2H_6$ | 0.74% |
| Acetylene | $C_2H_2$ | 0.00% |
| Hydrogen Sulfide | $H_2S$ | 1.82% |
| Propylene | $C_3H_6$ | 0.43% |
| Propane | $C_3H_8$ | 0.00% |
| HHV | Btu/dry scf | 312 |
|  | Btu/g dry feed | 9.1 |

TABLE 21-continued

PRODUCT GAS COMPOSITION AND YIELD FOR TEST 1 (1,000° F.)

| | | |
|---|---|---|
| Btu/lb dry feed | | 4,111 |
| Btu/Btu in dry feed | | 0.82 |

TABLE 22

PRODUCT GAS COMPOSITION AND YIELD FOR TEST 2 (1,300° F.)

| | | |
|---|---|---|
| Hydrogen | $H_2$ | 51.90% |
| Oxygen | $O_2$ | 0.00% |
| Nitrogen | $N_2$ | 0.00% |
| Methane | $CH_4$ | 9.48% |
| Carbon Monoxide | CO | 9.44% |
| Carbon Dioxide | $CO_2$ | 25.44% |
| Ethylene | $C_2H_4$ | 2.36% |
| Ethane | $C_2H_6$ | 0.42% |
| Acetylene | $C_2H_2$ | 0.04% |
| Hydrogen Sulfide | $H_2S$ | 0.69% |
| Propylene | $C_3H_6$ | 0.22% |
| Propane | $H_2$ | 0.00% |
| HHV | $O_2$ | 351 |
| | $N_2$ | 18.3 |
| | $CH_4$ | 8,315 |
| | $H_2$ | 1.65 |

The product gas composition on a dried basis is presented in Table 13. Steam reforming produces a medium-Btu reformate gas rich in hydrogen. The HHV is relatively high at 322 Btu/dscf. Product gas yield achieved 5,936 Btu/pound dry feed or a gas to dry feed HHV ratio of 1.2. This is greater than 1 due to the supply of endothermic heat of reaction by indirect heat transfer by the pulse combustion devices.

Closures for the material balances are shown by element in Table 14. Good closure was obtained for hydrogen, oxygen, ash, sulphur and chlorine. Closures of carbon, nitrogen, potassium and phosphorous, however, were not as good due to possible sample error.

Table 15 provides the lower and upper bounds for carbon conversion and the release of sulphur, chlorine, and nitrogen. The carbon conversion is high and can be improved by incorporating a cyclone, reducing freeboard heat losses and increasing gas residence time in the reactor. Practically all of the chlorine is released and a majority of the sulphur and nitrogen in the feed are released as well.

Tables 16 and 17 present a summary of VOC and SVOC species collected in the gas condensate. The gas condensates were collected with an EPA method 5 sampling train utilizing ice-water bath impendures.

The bed composition before and after all the tests are given in Table 18. For test 3, trace quantities of the elements are left in the bed. Very little carbon remains in the bed and the feed is either steam reformed or elutriated. This suggests that a bed drain need not be incorporated and a cyclone catch could be the reject solid stream.

The composition of the elutriated solids is shown in Table 19. Potassium and phosphorous and other inerts mostly seem to stay in the fines. There is significant amount of chloride in this stream and it is plausible that potassium and chloride combined to form a salt.

Table 20 indicates the nutrient distribution among the gas, cyclone catch and bed streams at 1500 degrees F. Both upper and lower limits are given. The lower limit corresponds to feed rate or "in" species and the upper limit corresponds to overall collection rate or "out" species. Nitrogen mainly reports as $NH_3$ in the gas phase while phosphorous and potassium show up predominately in the cyclone catch.

Tables 21 and 22 present the product gas composition and yield data for tests 1 and 2 respectively.

As shown in FIG. 6, the biomass system includes a steam reformer containing pulse combustion devices 12 and a fluidized bed 34. A product gas stream generated in the fluidized bed is fed to a gas turbine 38. When feeding animal waste to the system, preferably the waste material does not have a dimension exceeding two inches in length. If necessary, the waste material can be shredded or chopped. In this embodiment, a dryer has been eliminated from the system for simplicity but can be added, if necessary.

The fluidized bed 34 is a bubbling bed fluidized with superheated steam. The fluidized bed contains a particulate material having a mean particle size of from about 100 to about 250 microns. The particulate material is primarily an inert material, such as magnesium oxide or alumina.

Resonance tubes of the pulse combustion devices 12 serve as efficient sources of heat supply to support the endothermic steam-reforming reaction of the biomass. The resonance tubes of the pulse combustion devices are mounted perpendicular to the fluidization steam flow to enhance the heat transfer between the resonance tube walls and the fluid-bed particles.

Animal biomass is injected into the fluidized bed 34. A superheater 51 is used to preheat the fluidization steam before it enters the fluidized bed 34. The superheater 51 employs a portion of the sensible heat in the fuel gas stream to superheat the steam.

Solid separation and return is accomplished by a high efficiency, low maintenance cyclone 36. The cyclone 36 efficiently captures small particles and returns them to the bed for inventory control and additional reaction. Upon exiting the cyclone 36, the product gas is processed through the steam superheater 51.

A portion of the clean product gas can be recycled for firing in the pulse combustion devices. The flue gas leaving the pulse combustion devices 12 passes through a gas-to-gas heat exchanger 54 and to a boiler 62 then to an air preheater 63. The boiler 62 generates low pressure steam (55 PSIG). The superheated steam is primarily used for fluid bed fluidization. Excess is sent to the gas turbine combustor for injection into the gas turbine to boost power output.

If necessary, the system can include gas clean up devices for removing hydrogen sulphide and ammonia from the product gas. Following the superheater 51, the product gas stream is quenched, saturated with water and scrubbed of particulate matter when contacted with recirculated fluid in a high-energy venturi 52. A condensate bleed stream is discharged from the system. The product gas is then further cooled by countercurrent contact with recirculated liquid in a packed tower. The recirculated liquid is cooled in a non-contact heat exchanger. Two sorbent beds 60 in series are used to capture hydrogen sulphide and ammonia.

A major portion of the product gas generated by the fluidized bed 34 is compressed in a gas compressor 42 to slightly greater than turbine inlet pressure and supplied to the gas turbine combustor 40. Air is also compressed in an air compressor 44 and preheated in a heat exchanger 56. The air is supplied to the gas turbine combustor 40 as an oxidant. The products of combustion along with the excess steam from the super-heater are injected into the gas turbine generally 38. A generator 48 coupled to a gas turbine 46 produces electricity.

Air is heated in the preheater 63 and the heat exchanger 54 to near fluid bed temperature and used in the pulse combustion devices 12.

Solids captured in the cyclone 36 are drained continuously. The solids are cooled in a cooler 70. The potassium and phosphorous in the animal biomass is contained predominately in the solids. Therefore, the solids are a valuable byproduct and can be used as desired.

Tables 23 and 24 below provide the analysis for poultry litter and summarizes the performance and emissions of the tests conducted.

TABLE 23

POULTRY LITTER

| Ultimate Analysis | Weight %, Dry |
|---|---|
| Carbon | 37.52 |
| Hydrogen | 5.13 |
| Nitrogen | 3.71 |
| Sulfur | 0.50 |
| Chlorine | 1.06 |
| Ash | 21.34 |
| Oxygen | 31.82 |
| HHV, Btu/lb, Dry | 6,390 |
| Moisture, %, as received | 27.43 |

TABLE 24

PERFORMANCE SUMMARY

| NOMINAL SIZE | 77 kWe |
|---|---|
| Feed: | |
| Poultry Litter, tons per day | 3.48 |
| Microturbine net power, $kW_e$ | 87 |
| Plant Power Consumption, $kW_e$ | 10 |
| Net Power Export, $kW_e$ | 77 |
| Net Electrical Efficiency | |
| % HHV Basis | 14.2 |
| % LHV Basis | 15.2 |
| By product Ash Drain Rate, lb/h | 88 |
| Nutrient Content in Ash, wt % | 21 |
| EMISSIONS | |
| $No_x$, lb/MMBtu | 0.06 |
| $SO_2$, lb/MMBtu | 0.09 |
| Participates, lb/MMBtu | 0.0001 |
| CO, lb/MMBtu | 0.04 |
| VOC, lb/MMBtu | 0.003 |

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed:

1. A process for producing electricity from carbonaceous materials comprising the steps of:
   providing a fluidized bed containing a particulate material and a fluidizing medium, said fluidizing medium comprising steam;
   combusting a fuel source in a combustion device to form a combustion stream, said combustion stream indirectly heating said fluidized bed;
   feeding a carbonaceous material to said fluidized bed, said fluidized bed being at a temperature sufficient for said carbonaceous material to endothermically react with said steam to form a product gas stream;
   feeding said product gas stream to a gas turbine, said gas turbine combusting said product gas stream in order to rotate a turbine and generate electricity, said gas turbine producing a flue gas stream;
   combining an air stream with the product gas stream prior to combusting the product gas stream in the gas turbine, the air stream being preheated by the combustion stream exiting the combustion device;
   preheating at least a portion of the flue gas stream exiting the gas turbine by the combustion stream exiting the combustion device; and
   feeding at least a portion of said flue gas stream to said combustion device for combustion with said fuel source.

2. A process as defined in claim 1, wherein said carbonaceous material comprises a material selected from the group consisting of coal, pulp and paper waste, wood products, municipal waste, sewage, food waste, plant matter, animal waste, industrial waste, biomass and mixtures thereof.

3. A process as defined in claim 1, wherein said carbonaceous material comprises rice straw and wherein the process further comprises the step of collecting silica as a byproduct from said fluidized bed.

4. A process as defined in claim 1, wherein said carbonaceous material comprises animal waste and wherein a material selected from the group consisting of phosphorous, nitrogen and potassium are generated and collected during the process.

5. A process as defined in claim 1, wherein said fluidized bed is maintained at a temperature of from about 900 degrees F. to about 1800 degrees F.

6. A process as defined in claim 1, wherein said steam to said carbonaceous material have a weight ratio of from about 0.75:1 to about 3:1.

7. A process as defined in claim 1, wherein said combustion device is a pulse combustion device.

8. A process as defined in claim 1, wherein prior to said gas turbine, said product gas stream is fed to a heat exchanger for heating steam fed to said fluidized bed.

9. A process as defined in claim 1, wherein after exiting said fluidized bed, said combustion stream is fed to a steam generator for generating steam fed to said fluidized bed.

10. A process as defined in claim 1, wherein said product gas stream is fed to a compressor prior to being combusted in said gas turbine, said compressor compressing said product gas stream to a pressure greater than the inlet pressure of said gas turbine.

11. A process as defined in claim 10, wherein said product gas stream is mixed with the preheated air stream prior to being combusted in said gas turbine.

12. A process as defined in claim 1, wherein after exiting said fluidized bed, said combustion stream is fed to a steam generator for generating steam fed to said gas turbine.

13. A process as defined in claim 1, wherein the air stream is fed to a compressor and compressed prior to being preheated by the combustion stream exiting the combustion device.

* * * * *

UNITED STATES PATENT AND TRADEMARK OFFICE
CERTIFICATE OF CORRECTION

PATENT NO.        : 6,923,004 B2
APPLICATION NO. : 10/727784
DATED             : August 2, 2005
INVENTOR(S)       : Ravi Chandran et al.

It is certified that error appears in the above-identified patent and that said Letters Patent is hereby corrected as shown below:

Column 22, lines 35 and 36, "900 degrees F." should read --900 degrees F--

Signed and Sealed this

Twenty-fifth Day of July, 2006

JON W. DUDAS
*Director of the United States Patent and Trademark Office*